F. W. ROGERS.
PROCESS FOR WELDING DISSIMILAR METALS.
APPLICATION FILED DEC. 26, 1911.
1,056,061.  Patented Mar. 18, 1913.
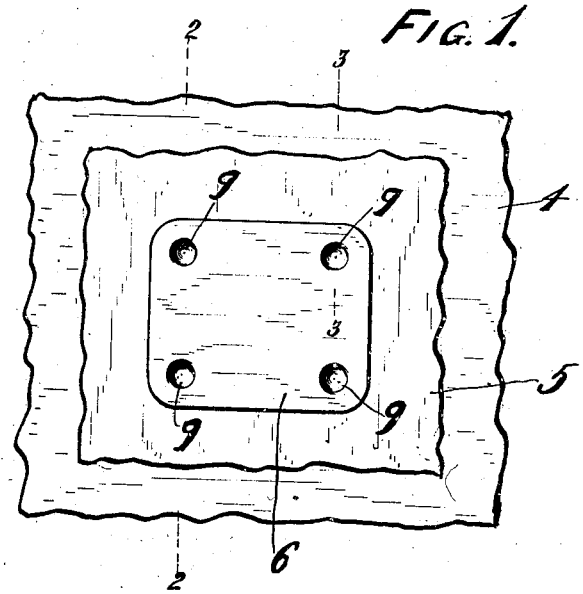
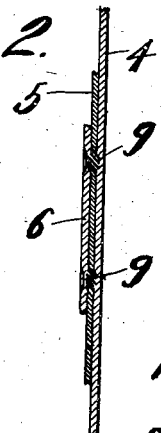
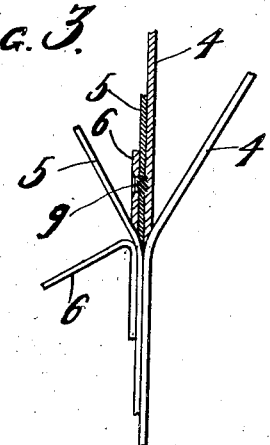
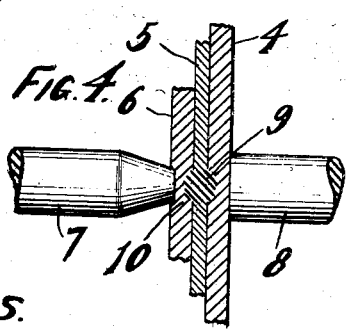
WITNESSES.  INVENTOR.
Frederick W. Rogers,
By Morsell & Caldwell
ATTORNEYS.

UNITED STATES PATENT OFFICE.

FREDERICK W. ROGERS, OF BEAVER DAM, WISCONSIN, ASSIGNOR TO MALLEABLE IRON RANGE COMPANY, OF BEAVER DAM, WISCONSIN, A CORPORATION OF WISCONSIN.

PROCESS FOR WELDING DISSIMILAR METALS.

1,056,061.　　　　　Specification of Letters Patent.　　Patented Mar. 18, 1913.

Application filed December 26, 1911. Serial No. 667,600.

*To all whom it may concern:*

Be it known that I, FREDERICK W. ROGERS, a citizen of the United States, and resident of Beaver Dam, in the county of Dodge and State of Wisconsin, have invented new and useful Improvements in Processes for Welding Dissimilar Metals, of which the following is a description, reference being had to the accompanying drawings, which are a part of this specification.

My invention relates to a process for welding dissimilar metals and the product resulting therefrom, and refers particularly (although not exclusively) to the welding of relatively corrosive and non-corrosive metals, such as iron or steel and copper.

I am aware that it has heretofore been possible to weld dissimilar metals, such as copper and steel, but this operation has always been difficult to carry out, in that it necessitates the melting of comparatively large amounts of metal on the one hand, or on the other consists in rolling together the highly heated metals.

It is the object of my invention to conduct the welding operation in such manner that the union of the metals is quickly and easily attained without the use of cumbersome apparatus. In order to accomplish this result I bring the two metals to be welded into contact with each other and then partially or wholly fuse the metal of lower melting point by applying heat thereto through the medium of a welding plate of higher melting point. Pressure is preferably applied to the metals at the same time, and the metal between the welding plate and the metal of higher melting point is united either to the latter alone or to the latter and the welding plate, by an alloying action.

In carrying out my process I ordinarily employ an electric current as the source of heat, and for the principal metals I use sheets of steel and copper, while the welding plate may be steel, nickel, German silver, Monel metal, or any similar metal or alloy which has a higher melting point than the copper and which preferably has a low heat conductivity.

When the electrodes of a welding machine are applied to the welding plate and the steel sheet, the flow of current is allowed to heat the welding plate and the steel to a temperature approximately corresponding to the melting point of the copper, and at the points of junction between the welding plate and the copper on the one hand and the copper and the steel on the other, the temperature is apt to increase somewhat on account of the increased resistance at these points. The copper is thereby alloyed with and welded to the steel and the welding plate.

Although I prefer to employ an electric current as the source of heat, it will be evident that any other similar heating means, such as a blow pipe, preferably used in connection with pressure applied to the plates, may be employed. Moreover, it is possible to so conduct the process that the welding plate is separated from the copper by an infusible layer of material so that the welding plate may be removed after the operation is completed.

These and other advantages of my invention will be more readily understood by reference to the accompanying drawing, which shows a preferred form of apparatus for carrying out my process and also illustrates the product resulting therefrom.

In the accompanying drawing, in which the same reference characters indicate the same parts in the several views: Figure 1 is a side view of three metallic plates, the lower plate being the steel or iron plate, the upper being the welding plate, and the intermediate plate being a plate of copper; Fig. 2 is a cross sectional view thereof taken on line 2—2 of Fig. 1; Fig. 3 is an edge view of the three plates shown in Fig. 1, and illustrates a cut partly through the plates, the cut being made on line 3—3 of Fig. 1, and the cut portions being pried apart; and Fig. 4 is a vertical section through the three plates, and also illustrates a pair of electrodes in position, the figure being on a larger scale.

Referring to the drawing, the numeral 4 indicates a plate of sheet steel or iron, and 5 a sheet of copper or other non-corrosive metal which it is desired to weld to the sheet steel or iron. To accomplish this welding, a comparatively small welding plate 6 is placed against the outer side of the sheet of copper or other non-corrosive metal, and the three pieces of metal are placed between the electrodes 7 and 8 of an electric welding machine.

The welding plate 6, while preferably formed of Monel metal, may also be made of iron or steel, nickel, German silver, or the like, the general characteristic of the welding plate being that it shall possess a higher melting point (and also preferably a lower heat conductivity) than the copper or like metal.

The three pieces of metal are pressed firmly together by the electrodes to form an intimate contact of the metals at the spot to be welded, and the current is then turned on to form the weld, or the plates may be clamped together in any manner desired and the electrodes positioned to form an arc between plates and the electrodes thus applying heat to the plates. When the current has thus been turned on, the heat generated by the resistance of the two outer plates will be concentrated and confined within a small area, and sufficient heat will thus be transmitted to the intermediate plate at a point between the electrodes to melt a part of the plate 5 and form a button-like portion 9 consisting of the metal of the plate 5 fused or alloyed with the inner surfaces of the plates 4 and 6. On account of imperfect contact between the plate 5 and the inner surfaces of the plates 4 and 6 the electrical resistance, and consequently the temperature, increases somewhat at these lines of junction, thereby facilitating the alloying action. As a result of the specific embodiment of my process as described, a spot weld is made which unites the three metals together. This process is of particular advantage in welding water reservoirs to the end heating plates of stoves and ranges, in order to provide an intimate and close contact between the inner wall of the water reservoir and the end plate of the stove or range, so that heat is readily and quickly transmitted to the water within the reservoir. The spot welds provide an integral metallic heat conductor between the heating chamber of the range and the water within the reservoir.

Although the apparatus or means which I have illustrated is for the purpose of spot welding sheets of copper and steel, it will be apparent that other apparatus could readily be employed to weld the metals over a greater area.

It will also be clear to those skilled in the art that instead of using electrodes to perform the welding operation, a blow pipe applied to the welding plate, or a pair of blow pipes applied to the welding plate and the sheet steel might readily be used, the copper thus being melted between the two metals and alloying with the same so that a weld is formed. The use of such heating means is preferably accompanied by the application of pressure so that the various plates are snugly contacted with each other before the welding is performed.

Other variations of the exact processes which I have described could readily be made without departing from either the spirit or scope of my invention.

What I claim is,

1. A process of welding two unlike metals, possessing different physical properties, which consists in utilizing a binding metal which possesses physical properties different from at least one of the other metals to be welded, and placing one of said metals to be welded between the binding metal and the other metal to be welded, and subjecting the three contacting metals to a welding heat sufficient to cause an integral weld between the two unlike metals.

2. A process of welding two unlike metals, possessing different physical properties, which consists in utilizing a binding metal possessing physical properties different from at least one of the other metals, and placing one of the metals to be welded between the binding metal and the other metal to be welded, and subjecting the three contacting metals to a welding heat sufficient to cause an integral weld between the three metals, the interposed metal freely fluxing with the other metals at the point of weld.

3. A process of welding two unlike metals, possessing different physical properties, and one of the metals possessing non-corrosive properties, which consists in utilizing a binding metal possessing physical properties different from at least one of the metals to be welded, and placing the non-corrosive metal to be welded between the binding metal and the other metal, and subjecting the three contacting metals to a welding heat sufficient to cause an integral weld between the two unlike metals.

4. A process of welding sheet copper to iron or steel, which consists in utilizing a sheet of binding metal possessing physical properties different from at least one of the metals to be welded, placing the copper between the binding metal and the other metal, and subjecting the three contacting metals to a welding heat sufficient to cause a weld between the three metals, the interposed sheet of copper freely fluxing with the other metals at the point of weld.

5. A process of welding sheet copper to iron or steel, which consists in utilizing a sheet of Monel metal and placing the sheet copper between the Monel metal and the iron or steel, and subjecting the three contacting metals to a welding heat sufficient to cause a weld between the three metals, the interposed sheet of copper freely fluxing with the other metals at the point of weld.

6. The process of uniting dissimilar metals, which consists in conducting heat through an auxiliary metal in contact with one of said first mentioned metals, whereby the latter will be fused together, substantially as described.

7. The process of uniting dissimilar metals, such as copper and steel, which consists in conducting heat through an auxiliary metal in contact with the metal having the lower melting point, as copper, whereby the latter will become melted and fuse with the second metal, as steel, substantially as described.

8. The process of uniting dissimilar metals, such as copper and steel, which consists in applying to the metal having the lower melting point, as copper, a welding plate having a higher melting point than the latter, and conducting heat through said welding plate, whereby the metal of lower melting point, as copper, is fused with the metal of higher melting point, as steel, substantially as described.

9. The process of uniting copper and steel, which consists in applying to the copper a welding plate having a higher melting point than that of the copper, and passing an electric current through the three metals in contact with each other, whereby the copper is melted and becomes fused with the steel, substantially as described.

10. The process of uniting copper and steel, which consists in applying to the copper a welding plate having a higher melting point and a lower heat conductivity than the copper, and applying heat to said welding plate, whereby the copper is melted and fused with said steel, substantially as described.

11. The process of uniting copper and steel, which consists in applying to the copper a welding plate having a higher melting point and a lower heat conductivity than the copper, applying pressure to the metals and passing an electric current through said metals, whereby the latter are heated, and the copper is melted and unites with said steel, substantially as described.

12. A process of welding two metals of dissimilar heat conductivity, consisting of placing the two metals together and also placing a third metal of less heat conductivity than the metal of higher conductivity against the said metal of higher conductivity and submitting the three metals to a welding heat.

In testimony whereof, I affix my signature in presence of two witnesses.

FREDERICK W. ROGERS.

Witnesses:
   Peter M. Kettenhofen,
   Silas McClure.